United States Patent

Hildebrand

[15] 3,655,258
[45] Apr. 11, 1972

[54] HOLOGRAPHIC IMAGING OF A MOVING OBJECT BY DETECTING RADIATION ALONG A LINE PERPENDICULAR TO THE OBJECT DIRECTION OF TRAVEL

[72] Inventor: Bernard P. Hildebrand, Seattle, Wash.
[73] Assignee: Holotron Corporation, Wilmington, Del.
[22] Filed: Apr. 20, 1970
[21] Appl. No.: 29,784

[52] U.S. Cl. ............................................. 350/3.5, 340/5 H
[51] Int. Cl. ........................................................ G02b 27/00
[58] Field of Search ................. 350/3.5; 340/5 H; 181/0.5 R, 181/0.5 AP, 0.5 J; 343/5 CM

[56] References Cited

UNITED STATES PATENTS

| 3,461,420 | 8/1969 | Silverman | 350/3.5 |
| 3,488,656 | 1/1970 | Anderson | 350/3.5 |
| 3,284,799 | 11/1966 | Ross | 350/3.5 |

Primary Examiner—David Schonberg
Assistant Examiner—Ronald J. Stern
Attorney—Woodcock, Phelan & Washburn

[57] ABSTRACT

An object is passed through a radiation beam along a line and resulting object-modified radiation is detected along a line substantially orthogonal to the object direction of travel. In a preferred embodiment, the radiation is ultrasonic energy and at least one ultrasonic radiation transducer (receiver) is repetitively scanned back and forth along this line in the object-modified radiation as the object moves through the illuminating beam. An electrical output from the transducer is compared with a reference signal that is coherent with the object illuminating beam to generate holographic information of the object in the form of an electrical analog signal. This holographic information electrical signal is utilized to form a hologram from which an optical image of the object may be reconstructed. Any aberrations present in the optical reconstructed image are substantially reduced by illuminating the object with a collimated ultrasonic radiation beam.

6 Claims, 6 Drawing Figures

Patented April 11, 1972 3,655,258

HOLOGRAPHIC IMAGING OF A MOVING OBJECT BY DETECTING RADIATION ALONG A LINE PERPENDICULAR TO THE OBJECT DIRECTION OF TRAVEL

BACKGROUND OF THE INVENTION

This invention relates generally to the art of forming a visible wavefront which is a replica in certain respects of another radiation wavefront containing information of an object scene. More specifically, this invention is related to holographic radiation imaging of a moving object.

In its broadest sense, the term "radiation" is defined as propagating energy. The particular form of the energy may be, for example, particle radiation, such as an electron beam, or electromagnetic radiation, such as light, or acoustic radiation, such as ultrasonic energy. The invention herein is described primarily in the environment of ultrasonic imaging since its greatest utility lies, at the present time, in such an application, but it is to be understood that the techniques of the present invention have utility when used with a wide variety of radiation types and wavelengths in the illumination of an object scene. In the broadest sense, the sonic frequencies utilized in "ultrasonic imaging" are not limited to any particular range but include the entire spectrum of compressional wave energy. However, in the more practical embodiments of that technique, it has been found that the higher sonic frequencies (i.e., those considerably above the audible range) are much more desirable than the lower sonic frequencies. For this reason, instead of utilizing the more general term "compressional wave energy" in this description, the term "ultrasonic energy" is utilized.

Visualization of ultrasonic wavefronts or fields passing through objects has been previously employed to study the properties of such objects and to determine the existence of flaws or defects therein. A continuous ultrasonic wavefront is generated by an appropriate source which forms an ultrasonic beam for passing through the object. The object then modifies the beam according to its interaction characteristics with the particular ultrasonic frequency utilized, thereby to form an object-modified ultrasonic beam which carries information of the object. Visualization of reflective ultrasonic wavefronts or fields has also been employed to detect the presence of objects in a large body of water which cannot be visualized directly. In either case, the ultrasonic energy beam, after modification by the object, carries information thereof which is desired to be translated from the ultrasonic to the optical domain.

The technique of ultrasonic holography provides a more complete translation of wavefronts than other known techniques. In holography, the phase as well as the intensity distribution across the object-modified ultrasonic energy is translated into a replica light wavefront. The phase of the object-modified radiation is compared with reference radiation but is coherent with the ultrasonic beam illuminating the object. This is performed in one manner by interfering a reference ultrasonic beam with the object-modified beam at a liquid-air interface detector to form a standing wave pattern which diffracts illuminating light into image carrying diffracted orders to form a three dimensional optical image of the object as viewed by ultrasound. The principles of ultrasonic holography are described with respect to this particular translation technique in copending patent application Ser. No. 569,914, filed Aug. 3, 1966. Refinements of the techniques therein are disclosed in copending patent application Ser. No. 730,260 filed May 20, 1968, issued June 22, 1971 as U.S. Pat. No. 3,585,847.

As an alternative to forming an ultrasonic hologram on a liquid-air interface, the interference pattern generated by the two intersecting beams may be detected over a two-dimensional surface in a manner to generate holographic information in the form of an electronic signal which may then be converted into an optical hologram by properly exposing photographic film or by display upon a cathode ray tube oscilloscope. One specific technique for accomplishing such detection utilizes a substantially point transducer that is scanned over a two-dimensional surface interference pattern. This technique is generally disclosed more fully by Preston and Kruezer, in Applied Physics Letters, Vol. 10, No. 5, Pages 150–152 (1967) and is utilized in the description in U.S. Pat. No. 3,410,363. A technique wherein a substantially point source is scanned over a two-dimensional surface area relative to the object while a substantially point receiver remains fixed relative to the object is disclosed to obtain the same results as receiver scanning in copending patent application Ser. No. 662,736, filed Aug. 23, 1967. Simultaneous scanning of the point receiver and the point source both over two-dimensional surface areas relative to the object and a general apparatus for scanning over a surface area is disclosed in copending patent application Ser. No. 744,732, filed July 15, 1968. Non-holographic rectilinear scanning is shown in one form in U.S. Pat. No. 2,989,864.

In copending patent application Ser. No. 782,582, filed Dec. 10, 1968, a technique is described wherein the object scene from which holographic information is to be obtained is scanned over a two-dimensional surface area relative to both the source and receiver. In order to obtain holographic information from which an unaberrated image of the object may be reconstructed, the object is scanned over a spherical surface area having a center of curvature at the actual or apparent substantially point receiver or point source.

It is a primary object of the present invention to provide a technique for obtaining holographic information of an object that is moving in line relative to its surroundings.

SUMMARY OF THE INVENTION

Briefly described, the present invention includes generating an object illumination beam from a radiation source that is fixed relative to its surroundings and moving the object under investigation in a line through the object illumination beam. Object illuminating radiation transmitted through or reflected from the object is detected along a line defined to be fixed relative to the surroundings and to be oriented substantially perpendicular to the direction of object travel. The radiation along this line is converted into electrical impulses by an array of transducers (receivers) or, in a preferred embodiment, by scanning at least one substantially point transducer repetitively back and forth along this line. Scanning at least one transducer provides high resolution more conveniently than a very large number of transducers fixed along the line relative to the surroundings. The electronic signal so generated is electrically compared with a reference signal coherent with the object illumination radiation to produce an electronic signal carrying holographic information of the object. A hologram is then formed directly on film according to one embodiment by exposing a photosensitive material to a fixed array of point light sources or by scanning thereover at least on a substantially point light source. The light sources are appropriately modulated by the holographic electrical signal. Alternatively, a hologram is formed on film by first displaying a hologram on a cathode ray tube driven by said holographic electrical signal and then by taking an ordinary photograph of displayed hologram. A resulting hologram formed on the photosensitive detector is then illuminated by coherent light in a manner to produce an optical image of the object. A useful application of this technique involves irradiating the object with ultrasonic energy to form a visual image for the detection of flaws in the object, thereby necessitating that the object, and all sources and receivers be submersed in an appropriate liquid ultrasonic energy transmitting medium, such as water.

An optical image, so reconstructed, requires that appropriate optics be placed in a light beam diffracted by the optical hologram to correct for astigmatism and unequal magnification of the reconstructed image in its two lateral directions. However, it has been found that if the radiation striking the moving object is collimated, the correcting optics are unnecesary because a good image is reconstructed directly from the optical hologram.

For a more detailed understanding of the various aspects of the present invention, the following detailed description of a few specific forms thereof may be read in conjunction with the drawings.

DESCRIPTION OF THE PREFERRED EMBODIMENTS

Figure 1:
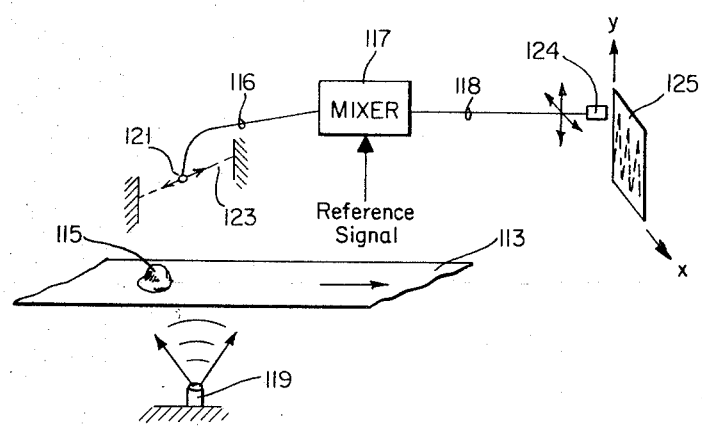
FIG. 1 shows the improved technique for holographic imaging of a moving object utilizing receiver scanning along a line.

The principles of the present invention may be understood by reference to FIG. 1. Consider a conveyor belt 113 moving an object 115 through a holographic object examination location. This object may be a production item desired to be examined for flaws by ultrasonic energy. An ultrasonic radiation source 119 fixed relative to the surroundings illuminates the object on the conveyor belt moving relative thereto. The source 119 is driven by an electronic oscillator (not shown). A substantially point receiver 121 is scanned back and forth along a line 123 defined relative to the surroundings. The receiver 121 must be small enough relative to the wavelength of the radiation being used to detect phase as well as amplitude information. It has been found that the object motion makes it unnecessary to scan the point receiver over a two-dimensional area. The much simpler line scanning illustrated herein accomplishes the same result.

An electrical output 116 of the receiver 121 is processed by an electronic balanced mixer 117 wherein a reference electrical signal coherent with the object illuminating radiation is mixed with the signal 116 to produce holographic information in the form of an electrical analog signal 118. The type of balanced mixer 117 preferred is a phase sensitive detector, and a product detector type has advantages for this application. The function of the mixer 117 is to compare the phase and intensity of ultrasonic radiation detected by the receiver 121 with a coherent reference electrical signal. The reference signal is coherent with the object illuminating radiation and is generally obtained from the electronic oscillator (not shown) which drives the source 119. The holographic signal modulates a substantially point light source 124 which is scanned across a photosensitive film 125 to form a hologram from which an optical image may be reconstructed. The light source 124 is moved in the "$y$" direction across the photosensitive film with a velocity corresponding to that of the receiver 121. The light source 124 moves with a velocity in the "$x$" direction which corresponds to the velocity of the object.

Figure 2:
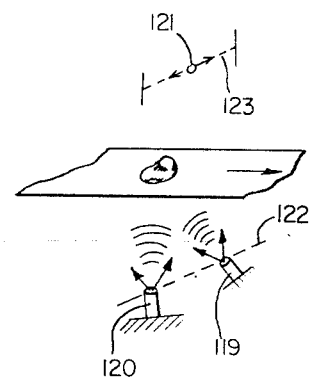
FIG. 2 illustrates a modification of the technique illustrated in FIG. 1.

In an alternative form, it has been found that the technique described with respect to FIG. 1 may include additional radiation sources, such as an ultrasonic radiation source 120 shown in FIG. 2. An additional source or sources may be used to provide additional radiation intensity or to illuminate the moving objects more completely from several directions. In order not to add any distortion to the reconstructed image by the use of more than one source, all sources must be coherent and placed along a line 122 that is substantially parallel to the scanning path line 123.

Figure 3:
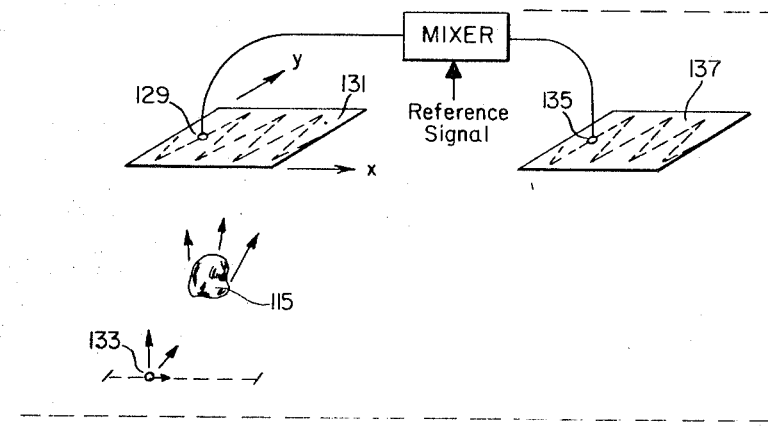
FIG. 3 demonstrates area receiver scanning to generate a hologram that is equivalent of that obtained by the process illustrated in FIG. 1.

An analysis of the scanning system illustrated in FIG. 1 may be made by reference to FIG. 3 wherein an equivalent scanning system is shown. The object 115 is fixed relative to its surroundings and a point receiver 129 is scanned over a two-dimensional hologram aperture 131. A substantially point radiation source 133 moves along a line in the "$x$" direction and is at all times in the same relative position along the "$x$" axis as is the radiation receiver 129. To form a hologram, an electrical signal from the receiver 129 is compared with a reference signal in an appropriate balanced mixer to generate a holographic electrical analog signal which is applied to a light source 135. The light source 135 is scanned over a photosensitive film 137 following the same pattern of the receiver 129, or a scaled replica thereof. The developed photosensitive material 137 will contain the same holographic information of the object 115 as will the developed photosensitive film 125. The important relationship in source and receiver scanning is between the velocities thereof relative to the object, and it may be seen by comparison of FIGS. 1 and 3 that these velocities may be made the same. For complete equality, the radiation receiver 129 has a velocity component in the "$y$" direction which is equal to the velocity of the radiation receiver 121 relative to its surroundings as it moves back and forth along the line 123. The velocity component of the radiation receiver 129 in the "$x$" direction, which is also the velocity of the radiation source 133, is equivalent to the speed at which the object 115 travels.

An image reconstructed from a hologram which has been constructed according to the techniques illustrated in FIGS. 1 or 3 will be distorted and have severe aberrations as a result of having unequal velocity ratios in the "$x$" and "$y$" directions between the source and receiver relative to the object. What happens upon reconstruction is, essentially, a reconstruction of two images spatially separated in a diffracted first-order beam, one image representing those lines of the object parallel to the "$x$" direction and the other image representing those lines of the object in the "$y$" direction.

Figure 4:
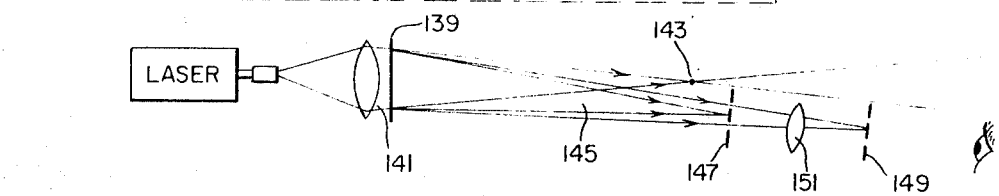
FIG. 4 shows a technique for reconstructing an image from a hologram constructed according to the technique of FIG. 1.

Although such an astigmatic image may be acceptable for certain object examinations, it is generally desirable to utilize a corrective optical system during reconstruction of an image. Referring to FIG. 4, a hologram 139 (a developed form of the detector 125 or 137) is illuminated with a slightly converging coherent light beam 141 which comes to focus at a point 143. A desired first-order beam 145 diffracted by the hologram 139 brings various points of the image to a focus at separate locations 147 and 149. One technique to correct for this aberration is to place a cylindrical lens 151 between the two images 147 and 149 so that the image 147 is transferred into a plane coincident with that wherein the image 149 lies without affecting the formation of the image 149. The viewer then sees an optical image of all object points with a proper relation to one another.

Figure 5:
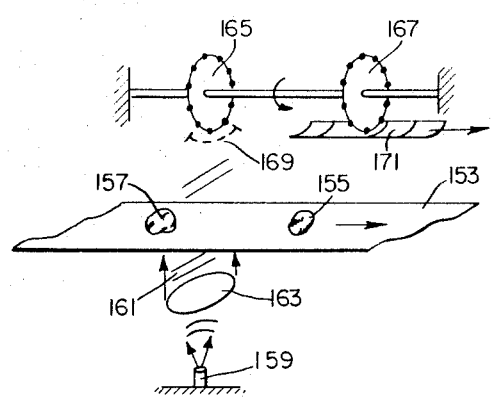
FIG. 5 shows a convenient mechanical implementation of the method shown in FIG. 1.
Figure 6:
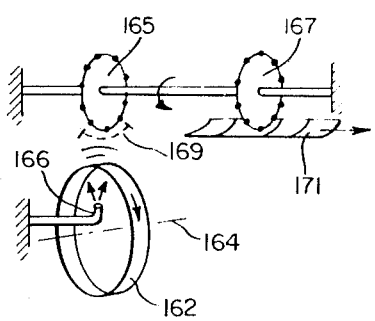
FIG. 6 is a modification of FIG. 5 wherein the object includes an endless belt portion that is rotated about a radiation source.

A practical apparatus for carrying out the technique discussed with respect to FIG. 1 is shown in FIG. 5 wherein rotary scanning is employed. The specific arrangements disclosed in FIGS. 5 and 6 are specifically claimed in copending application Ser. No. 820,862, filed May 1, 1969 by Daniel S. St. John. A conveyor 153 carries a series of objects under investigation, such as objects 155 and 157, passed a holographic examination station. A radiation source, 159 which is fixed relative to its surroundings, directs a beam through the conveyor belt and objects passing therethrough. The object illuminating beam 161 is preferably collimated, which may be accomplished by the use of an acoustic lens 163. Alternatively, a collimated ultrasonic beam 161 may be generated by a flat ultrasonic transducer without need for a lens.

A scanning wheel 165 contains a plurality of point radiation receivers, each connected with appropriate information processing electronics (including a phase sensitive detector) to its own point light source on a disk 167. The line scanned by the point receivers is now a curved line 169, so it is preferable that the disk 165 be of sufficient diameter that the length of the line 169 is only a small fraction of the circumference of the disk, thereby avoiding any severe distortions due to a curved hologram aperture. To construct a hologram of the objects, a strip film 171 is moved past the rotating point light source carrying disk 167 at a speed proportional to that at which the conveyor 153 moves relative to the receiver scanning disk 165. The light sources attached to the wheel 167 are appropriately focused onto the film 171.

Use of a collimated beam 161 has two distinct advantages over use of a diverging beam. First, the energy of the object illuminating beam is concentrated and there is no energy density diminution due to a diverging beam prior to reaching the receivers. Secondly, illumination with a collimated source has the advantage that a hologram constructed thereby reconstructs directly an image of the object without astigmatism and thereby makes unnecessary correcting optics. A hologram constructed according to FIG. 5 with a collimated object illuminating beam 161 is reconstructed according to the technique described with respect to FIG. 4 but without need for the correction lens 151.

Certain objects may be more conveniently examined by the techniques of the present invention by rotating them about their own axis instead of moving them past a holographic examination station by a conveyor-like drive. Such a modification is illustrated in FIG. 6 wherein those elements that are the same as those shown in FIG. 5 are given the same reference numbers. An endless object 162 is rotated about its own axis 164. Within the object 162 is a point radiation source 166 which is fixed relative to the surroundings. The object 162 is oriented to rotate in a plane substantially perpendicular to the plane in which the scanning wheel 165 rotates. This technique is especially useful for ultrasonic examination of tires which are rotated one at a time as the object 162.

As will be recognized from the discussion hereinbefore, the holographic information recorded on the film 171 will reconstruct an image of the object 162 that is distorted and astigmatic. This is no problem in most examination applications but if it is, the film 171, after development, may be reconstructed as discussed with respect to FIG. 4.

What is claimed is:

1. A method of obtaining holographic information of an object moving relative to its surroundings, comprising the steps of:
   generating a coherent radiation object illuminating beam that is stationary relative to the surroundings, said beam being positioned for the object to move therethrough thereby to generate object-modified radiation,
   detecting said object-modified only along a substantially straight line which is stationary relative to the surroundings and oriented substantially orthogonal to said object travel direction, and
   comparing the detected object-modified radiation with the phase and intensity of a reference waveform that is coherent with the object illuminating radiation, whereby holographic information of the object is obtained.

2. The method according to claim 1 wherein the step of detecting said object-modified radiation along a line includes repetitively scanning at least one substantially point radiation receiver back-and-forth along said line.

3. The method according to claim 1 wherein the step of illuminating said object includes placing a plurality of sources along a line that is substantially parallel to said defined detecting line.

4. A method according to claim 1 wherein the step of generating a coherent object illumination beam includes generating a substantially collimated radiation beam.

5. In a method of obtaining holographic information of an object moving relative to its surroundings through a coherent non-collimated illuminating beam that is stationary relative to the surroundings thereby to generate object-modified radiation, detecting the object-modified radiation only along a substantially straight line which is stationary relative to the surroundings and orientated substantially orthogonal to the direction of movement of the object, comparing the detected object-modified radiation with the phase and intensity of a reference waveform that is coherent with the object illuminating beam to obtain holographic information, and recording the holographic information to form a hologram, the improvement of reconstructing a non-astigmatic image of the object comprising the steps of: illuminating the hologram with light to produce at least one astigmatic image carrying diffracted wavefront, and positioning optics for correcting astigmatism in the path of said at least one image carrying diffracted wavefront, whereby a non-astigmatic image of the object is formed.

6. A method of obtaining holographic information of a moving object, comprising the steps of:
   moving an object along a path of travel relative to its surroundings,
   directing at the path of travel an object illuminating beam of coherent radiation that is stationary relative to the surroundings, said beam being positioned for the object to move therethrough thereby to generate object-modified radiation,
   detecting said object-modified radiation only along a substantially straight line which is stationary relative to the surroundings and orientated substantially orthogonal to the path of travel of said object, and
   comparing the detected object-modified radiation with the phase and intensity of a reference waveform that is coherent with the object illuminating radiation whereby holographic information is obtained.

* * * * *